Jan. 6, 1925.

F. J. DRUAR

MOTOR VEHICLE

Filed March 26, 1920     2 Sheets-Sheet 1

1,521,672

Inventor,
Frank J. Druar,
By Milton Tibbetts, Atty.

Jan. 6, 1925.

F. J. DRUAR

MOTOR VEHICLE

Filed March 26, 1920

Inventor,
Frank J. Druar,
By Milton Sibbetts, Atty.

Patented Jan. 6, 1925.

1,521,672

UNITED STATES PATENT OFFICE.

FRANK J. DRUAR, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed March 26, 1920. Serial No. 368,977.

*To all whom it may concern:*

Be it known that I, FRANK J. DRUAR, a citizen of the United States, and resident of Detroit, Wayne County, State of Michigan, have invented certain new and useful Improvements in Motor Vehicles, of which the following is a specification.

This invention relates to motor vehicles and particularly to the transmission mechanisms of vehicles driven by hydrocarbon motors.

The object of the invention is to provide effective means for making it possible to obtain as many speeds in reverse direction as in forward direction.

The invention is of particular value in connection with motor vehicles designed to run on rails, such as trucks employed in large factories.

With the above objects and others in view, the invention is embodied in preferable form in the construction and arrangement hereinafter described and illustrated in the accompanying drawings, in which—

Fig. 3 is a sectional view through the auxiliary transmission constituting the chief element of my invention.

Figure 1:
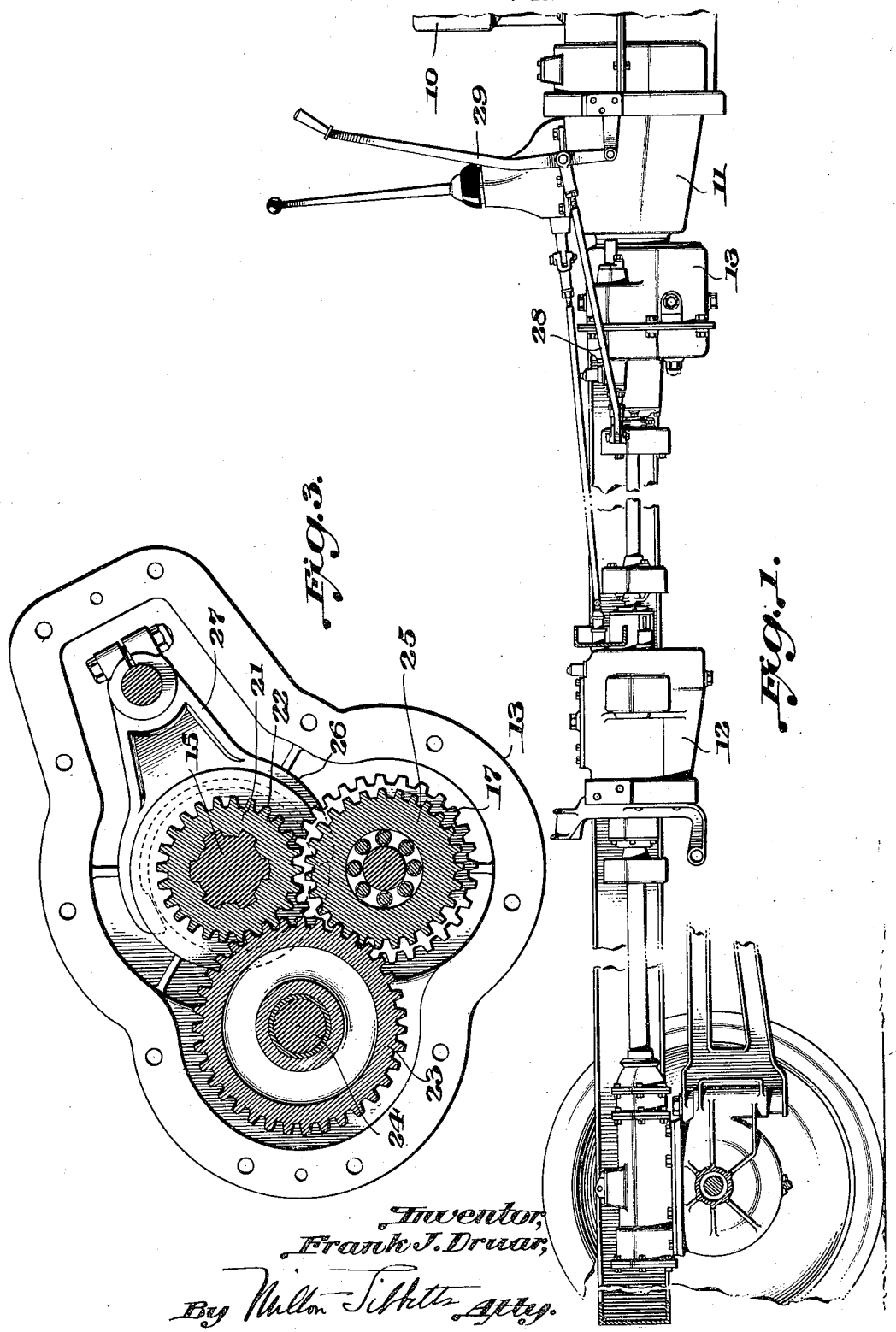
Fig. 1 is a side elevation of a motor vehicle showing the change speed mechanism and the features constituting the invention in vertical section.

Referring to the drawings, 10 indicates a hydrocarbon motor and 11 the casing for the clutch between said motor and the driven parts of the vehicle. A gear box 12 is mounted on the frame of the motor vehicle and in this box may be a change speed mechanism including gears of such numbers and ratios as to be adapted to effect the desired number of different speeds in forward direction.

Figure 2:
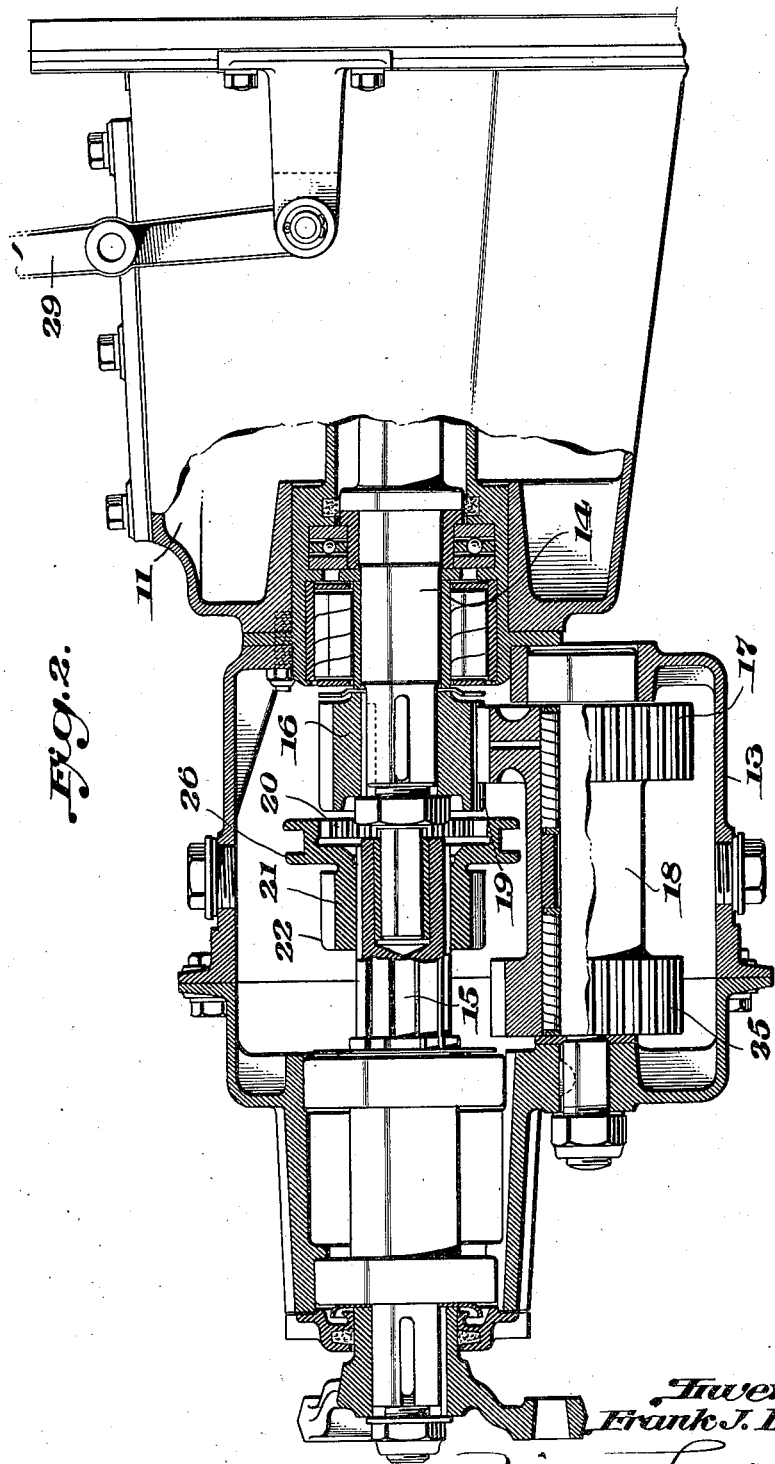
Fig. 2 is a view of the said features constituting the invention shown in horizontal section.

Fixed on the clutch casing 11, is an auxiliary casing 13 within which is mounted the auxiliary gear mechanism constituting my invention. The propeller shaft extends through this auxiliary gear box and is divided into two sections 14 and 15. On the section 14 is keyed a gear 16 having constant mesh with a gear 17 fixed on a counter shaft 18. The teeth of the gear 16 extend beyond the ends of the teeth of the gear 17 as indicated at 19 in Fig. 2, and are adapted for engagement with the internal clutch teeth 20 of a shiftable gear 21 keyed on the propeller shaft section 15, which is the driven section of the shaft. The gear 21 has external gear teeth 22 adapted, when the gear is shifted rearward, to engage a reversing gear 23, carried on a small stub shaft 24, mounted in the wall of the casing 13. (See Fig. 3). This gear 23 is in constant mesh with a gear 25 on the counter shaft 18. The gear 21 has a grooved collar 26 adapted to be engaged by the fork 27 of a shifter rod 28 which may be operated by a lever 29.

When the gear 21 is shifted forward so that its internal teeth will have clutching engagement with the teeth of the gear 16, the two sections 14 and 15 of the shaft will be locked together for forward drive. Any changes of speed for forward direction are made through the main change speed mechanism. The gear 21 may be shifted rearward until its teeth engage those of the gear 23, whereupon the drive from the shaft section 14 to the section 15 will be from the gear 16, gear 25, gear 23 and gear 21, thus reversing the direction of drive of the gear 21 and consequently reversing the drive of the driven propeller shaft section 15. It will be seen that this reversing action may be effected without the adjustment of the gears of the change speed mechanism of the transmission, the reversing mechanism being entirely auxiliary to that of the change speed gear box. By this arrangement the propeller shaft may be driven in either direction at any of the speeds at which the change speed mechanism may be set.

This construction renders the vehicle especially adaptable for transportation purposes in yards, factories and other buildings where it is desired to propel the vehicle in either direction at any speed of which the same is capable.

Having thus described my invention what I claim and desire to secure by Letters Patent is:

In a motor vehicle, a motor, a change speed mechanism, a main clutch, a casing for said clutch, a propeller shaft divided into two sections between the clutch and change speed mechanism, and means mounted on the clutch casing for connecting said sections including a direct connection for forward drive, and a reversing gear operable when connected to said sections to effect reverse drive at substantially the same speed.

In testimony whereof I affix my signature.

FRANK J. DRUAR.